H. N. GORHAM.
DENTAL INSTRUMENT.
APPLICATION FILED MAR. 12, 1917.
1,232,280.
Patented July 3, 1917.
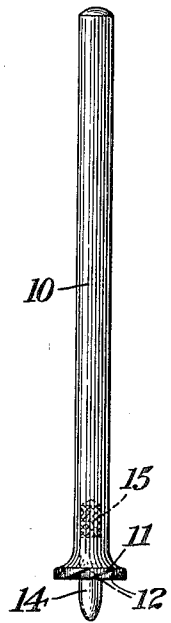
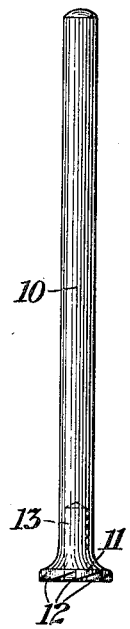
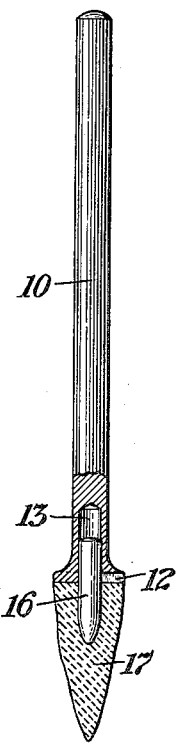
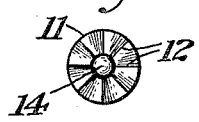
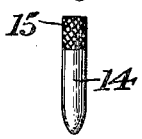
WITNESS:
INVENTOR
Herbert N. Gorham

UNITED STATES PATENT OFFICE.

HERBERT N. GORHAM, OF BROOKLYN, NEW YORK.

DENTAL INSTRUMENT.

1,232,280.          Specification of Letters Patent.          Patented July 3, 1917.

Application filed March 12, 1917. Serial No. 154,131.

*To all whom it may concern:*

Be it known that I, HERBERT N. GORHAM, a citizen of the United States, residing in the borough of Brooklyn, county of Kings, city and State of New York, have invented an Improvement in Dental Instruments, of which the following is a specification.

This invention relates to a dental instrument and more particularly to a tool adapted to be employed in facing the root of a tooth preparatory to placing a crown thereon. Heretofore in crowning teeth in the original operation it has been customary to first prepare the canal in the root of the tooth to receive the pin or dowel employed in securing the crown in position thereon, and then to use a facing tool for preparing the surface of the tooth to abut against the crown. The tool commonly so employed is provided with a pin made integral therewith for centering and guiding the facing tool. In cases where it is necessary to re-crown a tooth it has been customary heretofore to remove the pin or dowel of the crown and re-prepare the canal in the root of the tooth, and in removing this pin or dowel it has been necessary obviously to enlarge the bore in the root of the tooth, necessitating the use of a larger dowel pin for the new crown, or the use of additional cement in which to embed the pin, both of which weaken the root of the tooth.

The object of my present invention is the provision of a dental instrument comprising a tool so constructed as to overcome the difficulties and disadvantages hereinbefore named, and the facing tool made in accordance with my invention preferably comprises a mandrel or shank having a head at one end in which cutting teeth or edges are provided in a plane at right angles to the axis of a mandrel or shank which at the head end is provided with a bore extending axially an appreciable distance into this end of the mandrel and adapted to receive a removable pin so that in the use of the instrument when originally crowning a tooth the removable pin may be employed to center and guide the tool in the cutting operation; whereas in recrowning a tooth the pin is removed and the dowel pin in the root of the tooth permitted to enter the bore in the mandrel to center and guide the same in refacing the root of the tooth preparatory to placing a new crown thereon.

In the drawing:

Figure 1 is an elevation of a dental facing tool made in accordance with my invention.

Fig. 2 is a plan view of the head end of the same.

Fig. 3 is a view similar to Fig. 1 showing the pin removed.

Fig. 4 is an elevation and partial cross section illustrating the application of the tool in facing the root of the tooth preparatory to recrowning the same, and Fig. 5 is an elevation of the removable pin.

Referring to the drawing it will be seen that my improved dental tool preferably comprises a shank 10 made of steel or any other suitable metal and adapted to be secured in the usual handle attached to the end of a flexible chain turned by a dental engine or other suitable means. At one end the shank or mandrel 10 is provided with a head 11 preferably made integral therewith and this head 11 in its face and in a plane at right angles to the axis of the mandrel is provided with a suitable number of teeth or cutting edges 12. These may be made as will be understood, in any approved manner. In the head end of the mandrel there is also a bore 13 extending axially from this end of the mandrel an appreciable distance into the same so as to receive a pin 14. As shown in Figs. 4 and 5, one end of this pin 14 may be suitably knurled as indicated at 15 so as to be the better frictionally retained within the bore 13, and when in position therein as shown in Fig. 1 the knurled end 15 of the pin lies at the base of the bore 13, while the opposite end of the pin projects an appreciable distance beyond the cutting edge of the tool. In the use of this instrument as hereinbefore indicated, the pin 14 is inserted in the bore 13 to act as a guide in centering the tool when preparing the root of a tooth for receiving an original crown, after of course, the canal in the root of the tooth has been suitably prepared to receive the pin; whereas in instances in which it is necessary to place a new crown on a tooth it is unnecessary in the use of this instrument to remove the dowel pin 16 from the root 17 of the tooth because this may be and is employed, after the removable pin 14 has been taken out of the mandrel, as a means for guiding and centering the facing tool in preparing the root of the tooth for the new crown. In such an operation as will be understood, that part of the dowel pin 16 which protrudes from the root 17 of the tooth, as shown in Fig. 4, enters the bore 13 in the mandrel of the facing instrument thus making it unnecessary to remove the dowel pin employed for securing in place the original crown.

I claim as my invention:

1. A dental tool comprising a mandrel having a head at one end thereof with cutting edges in a plane at right angles to the axis of the mandrel, the said mandrel being provided with a bore extending axially into the same from the head end thereof to receive a pin fixed in the root of a tooth to center the tool in refacing the tooth for a new crown.

2. A dental tool comprising a mandrel having a head at one end thereof with cutting edges at an angle to the axis of the mandrel, the said mandrel being provided with a bore extending axially into the same from the head end thereof to receive a pin fixed in the root of a tooth to center the tool in refacing the tooth for a new crown.

Signed by me this 7th day of March, 1917.

HERBERT N. GORHAM.

Copies of this patent may be obtained for five cents each, by addressing the "Commissioner of Patents, Washington, D. C."